United States Patent
Haselhuhn (10) Patent No.: US 11,364,563 B2
(45) Date of Patent: Jun. 21, 2022

(54) METHOD FOR RESISTANCE SPOT WELDING A STACKED ASSEMBLY OF DISSIMILAR METAL WORKPIECES AND A RESISTANCE SPOT WELDED STACK ASSEMBLY OF DISSIMILAR METALS

(71) Applicant: GM Global Technology Operations LLC, Detroit, MI (US)

(72) Inventor: Amberlee S. Haselhuhn, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 112 days.

(21) Appl. No.: 17/082,447

(22) Filed: Oct. 28, 2020

(65) Prior Publication Data
US 2022/0126390 A1   Apr. 28, 2022

(51) Int. Cl.
| | | |
|---|---|---|
| B23K 11/20 | (2006.01) | |
| B23K 11/11 | (2006.01) | |
| B23K 33/00 | (2006.01) | |
| B32B 7/12 | (2006.01) | |
| B32B 15/01 | (2006.01) | |
| B23K 103/04 | (2006.01) | |
| B23K 103/08 | (2006.01) | |

(52) U.S. Cl.
CPC ............ *B23K 11/20* (2013.01); *B23K 11/115* (2013.01); *B23K 33/002* (2013.01); *B32B 7/12* (2013.01); *B32B 15/011* (2013.01); *B32B 15/012* (2013.01); *B32B 15/015* (2013.01); *B23K 2103/04* (2018.08); *B23K 2103/08* (2018.08)

(58) Field of Classification Search
None
See application file for complete search history.

(56) References Cited

U.S. PATENT DOCUMENTS

| | | | | |
|---|---|---|---|---|
| 10,682,724 | B2* | 6/2020 | Sigler | B23K 11/315 |
| 10,766,095 | B2* | 9/2020 | Wang | B23K 11/163 |
| 2015/0231730 | A1* | 8/2015 | Yang | B23K 11/20 |
| | | | | 219/93 |
| 2018/0361498 | A1* | 12/2018 | Zhang | B23K 20/2333 |
| 2019/0262930 | A1* | 8/2019 | Sigler | B23K 11/115 |
| 2019/0329348 | A1* | 10/2019 | Zhang | B23K 20/10 |
| 2020/0114459 | A1* | 4/2020 | Haselhuhn | B23K 11/20 |

* cited by examiner

*Primary Examiner* — Daniel J. Schleis
(74) *Attorney, Agent, or Firm* — Vivacqua Crane PLLC (57) ABSTRACT

A method of resistance spot welding a stacked assembly of dissimilar workpieces. The stack assembly includes a first workpiece formed of a first alloy, a second workpiece formed of a second alloy, and a third workpiece formed of a third alloy sandwiched between the first workpiece and the second workpiece. The third alloy includes a lower resistivity than the first alloy and a lower resistivity than the second alloy. A faying interface is defined by a portion of the first workpiece in direct contact with a portion of the second workpiece through the third workpiece. A weld nugget, a braze, or a combination of a weld nugget and a braze joins the first workpiece to the second workpiece at the faying interface. An annular ring of re-solidified molten pool of third alloy surrounds the faying interface and a region of re-solidified partially melted third alloy surrounding the annular ring.

20 Claims, 6 Drawing Sheets

METHOD FOR RESISTANCE SPOT WELDING A STACKED ASSEMBLY OF DISSIMILAR METAL WORKPIECES AND A RESISTANCE SPOT WELDED STACK ASSEMBLY OF DISSIMILAR METALS

INTRODUCTION

The present disclosure relates to a method for resistance spot welding of a stacked assembly, particularly to a method for resistance spot welding a stacked assembly of dissimilar metals workpieces, and more particularly to a resistance spot welded stack assembly of dissimilar metals.

The automotive industry often uses resistance spot welding to join together assemblies of stacked metal workpieces, also referred to as a stacked assembly, for the manufacturing of vehicle structural body components such as vehicle pillars, structural beams, inner and outer body panels, hoods, trunk lids, and the likes. Typically, a number of spot welds are formed along a peripheral edge, or some other bonding region, of the stacked assembly to ensure that the vehicle body component is structurally sound.

Resistance spot welding, in general, relies on the resistance to a flow of an electrical current through contacting metal workpieces and across their faying interface to generate heat. Typically, a pair of opposed spot welding electrodes are clamped at diametrically aligned spots on opposite sides of the stacked assembly at a predetermined weld site. An electrical current is then passed through the metal workpieces from one electrode to the other. Resistance to the flow of this electrical current generates heat within the metal workpieces and at their faying interfaces.

Spot welding of dissimilar metal workpieces, such as a steel workpiece to an aluminum workpiece, presents some challenges. Steel has a relatively higher melting point, approximately 1500° C., and a relatively higher resistivity than aluminum. Aluminum has a relatively lower melting point, approximately 660° C. and a relatively lower resistivity than steel. The challenge of spot welding dissimilar metal workpieces is further increased when a relatively thin aluminum workpiece is sandwiched between two steel workpieces. Such a steel-aluminum-steel stacked assembly can be difficult to join by traditional resistance spot welding due to differences in bulk resistivity that produces uneven heat penetration through the workpieces. Further challenges in resistance spot welding an aluminum workpiece to a steel workpiece are the formation of iron-aluminum intermetallics at the faying interface and oxide film inclusions that form within the aluminum weld nugget.

Thus, while current methods of resistance spot welding of a stacked assembly achieve their intended purpose, there is a need for a new and improved method for resistance spot welding of a stacked assembly of dissimilar metal workpieces.

SUMMARY

According to several aspects, a method of resistance spot welding a stack assembly of dissimilar metal pieces is disclosed. The method includes arranging a first workpiece having an external surface and an opposite faying surface, a second workpiece having an external surface and an opposite faying surface defining a protrusion, and a third workpiece have a first faying surface and an opposite second faying surface, such that the faying surface of the first workpiece is in abutting contact with the first faying surface of the third workpiece and the protrusion of the faying surface of the second workpiece is in abutting contact with the second faying surface of the third workpiece. The method includes resistance spot welding the first workpiece, the second workpiece, and the third workpiece by passing an electric current between the external surface of the first workpiece and the external surface of the second workpiece through the protrusion.

In an additional aspect of the present disclosure, the third workpiece includes a lower electrical resistivity and a lower melting temperature than the first and second workpieces. The electric current includes a sufficient direct current to melt a portion of the third workpiece immediately adjacent the protrusion into a molten pool.

In another aspect of the present disclosure, the method further includes applying a sufficient compression force onto the external surface of the first workpiece and on the external surface of the second workpiece to urge the protrusion to penetrate and to displace the molten pool to make way for the faying surface of the second workpiece to contact the faying surface of the first workpiece to define a faying interface. The method also includes applying a sufficient direct current to form at least one weld nugget at the faying interface to join the first workpiece to the second workpiece with the third workpiece sandwiched therebetween.

In another aspect of the present disclosure, the compression force is sufficient to cause the protrusion to displace the molten pool into an annular ring surrounding the faying interface.

In another aspect of the present disclosure, the first workpiece is a first steel alloy, the second workpiece is a second steel alloy, and the third workpiece is an aluminum alloy, a copper alloy, or a magnesium alloy.

In another aspect of the present disclosure, the third workpiece includes a thickness (T3) of about 0.4 mm to about 0.5 mm. The protrusion includes a width (W) of about 1.0 mm to 3.0 mm and a height (H) of about 0.1 mm to about 1.0 mm.

In another aspect of the present disclosure, the first workpiece includes a first thickness (T1) and the second workpiece includes a second thickness (T2), wherein each of T1 and T2 is between about 0.9 mm to about 3.0 mm.

In another aspect of the present disclosure, the direct current comprises about 8 kilo-amps (kA) to about 14 kA.

In another aspect of the present disclosure, the compression force is between about 2 Kilo-Newton (kN) to about 5 kN.

In another aspect of the present disclosure, applying a weld-through structural adhesive between the first workpiece and the third workpiece and between the second workpiece and the third workpiece.

According to several aspects, a method of resistance spot welding a stack assembly is disclosed. The method includes forming a stack assembly by sandwiching an aluminum sheet between a first steel sheet and a second steel sheet. The second steel sheet includes a protrusion in abutting contact with the aluminum sheet at a predetermined weld site. Resistance spot welding the stack assembly at the predetermined weld site by applying a direct current through the stack assembly at the predetermined weld site to melt a portion of the aluminum sheet immediately adjacent the protrusion into a molten pool of aluminum and applying a compression force at the predetermined weld site to urge the protrusion to penetrate and displaces the molten pool to make way for the faying surface of the second steel sheet to contact the faying surface of the first steel sheet to define a faying interface.

In an additional aspect of the present disclosure, the resistance spot welding includes applying a sufficient direct current and a sufficient compression force to form a braze at the faying interface to join the first steel sheet to the second steel sheet thereby retaining the aluminum sheet therebetween.

In another aspect of the present disclosure, the resistance spot welding includes applying a sufficient direct current and a sufficient compression force to form a weld nugget at the faying interface to join the first steel sheet to the second steel sheet.

In another aspect of the present disclosure, the second steel sheet includes an external surface defining a recession opposite the protrusion for locating the predetermined weld site.

In another aspect of the present disclosure, the resistance spot welding includes applying a sufficient direct current and a sufficient compression force to form a second braze joint between the first steel sheet and the aluminum sheet, and a third braze joint between the second steel sheet and the aluminum sheet.

According to several aspects, a stack assembly is disclosed. The stack assembly includes a first sheet having a first alloy, a second sheet having a second alloy, and a third sheet having a third alloy sandwiched between the first sheet and the second sheet, the third alloy includes a lower resistivity and a lower melting temperature than the first alloy and the second alloy; a faying interface defined by a portion of the first sheet in direct contact with a portion of the second sheet through the third sheet; a weld nugget joining the first sheet to the second sheet at the faying interface; and an annular ring of re-solidified molten pool of third alloy surrounding the faying interface.

In an additional aspect of the present disclosure, the stack assembly further includes a first braze at the faying interface joining the first sheet to the second sheet.

In another aspect of the present disclosure, the stack assembly further includes a second braze between the first sheet and the third sheet, and a third braze between the second sheet and the third sheet.

In another aspect of the present disclosure, the stack assembly further includes a root notch area defined by a divergence of the first sheet and the second sheet from the faying interface, the root notch area includes a notch root angle ($\alpha$) of between about 10 to about 30 degrees.

In another aspect of the present disclosure, the stack assembly further includes a region of re-solidified partially melted third alloy surrounding the annular ring.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The figures are not necessarily to scale and some features may be exaggerated or minimized to show particular details.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
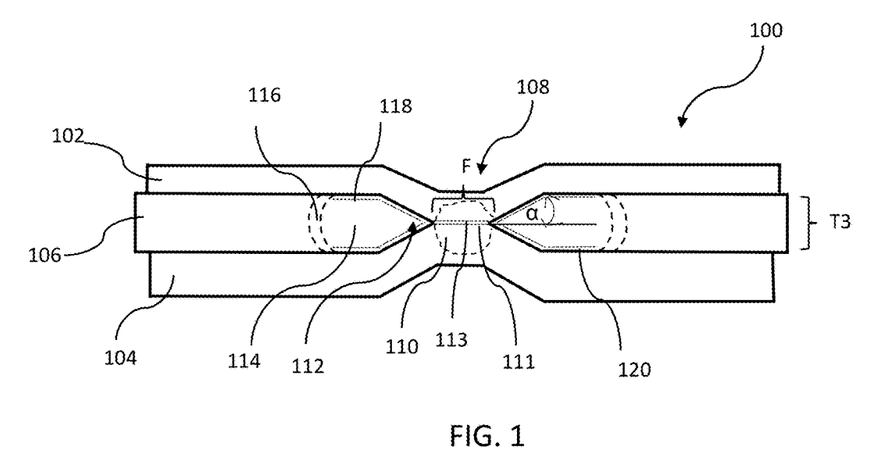
FIG. 1 is a diagrammatic cross-sectional side view of a resistance spot welded assembly of stacked dissimilar metal workpieces, according to an exemplary embodiment.

FIG. 1 shows a cross-sectional side view of a resistance spot welded assembly 100, also referred to as a stacked assembly 100, having a first workpiece 102, a second workpiece 104, and a third workpiece 106 sandwiched between the first workpiece 102 and the second workpiece 104. The second workpiece 104 includes unique features when resistance spot welded with the method 600, which is disclosed in detail below. The method 600 produces a robust spot weld 108 capable of joining metal workpieces having disparate material properties, also referred to as dissimilar metal workpieces.

The first workpiece 102 and the second workpiece 104 are formed of a steel alloy such as interstitial free (low carbon steel), high strength low alloy (HSLA), dual phase (DP), transformation induced plasticity steel (TRIP), twinning-induced plasticity steel (TWIP), third-generation advanced high strength steel (Gen 3), Multi-Phase, press hardened, and martensitic. The resistivity of steel alloys typically ranges from approximately 10 to 50 micro-ohm/cm, more typically from 12 to 35 micro-ohm/cm. The third workpiece 106 is formed of an aluminum alloy such as an aluminum-magnesium alloy, aluminum-silicon alloy, aluminum-magnesium-silicon alloy, aluminum-zinc alloy, or aluminum metal. However, the third workpiece may be formed of other alloys having a lower resistivity and lower melting point than that of the steel alloys. For example, the third workpiece 106 may be formed of a magnesium or copper alloy. The form of the first, second, and third workpieces 102, 104, 106 may be that of a sheet, cast, or extrusion form. In the disclosed embodiment, the workpieces 102, 104, and 106 are in sheet form, also referred to as panels.

For brevity, steel alloys and aluminum alloys are referred to herein as steel and aluminum, respectively. The first workpiece 102 and the second workpiece 104 are also referred to as a first steel workpiece 102 and a second steel workpiece 104, respectively. The third workpiece 106 is also referred to as a third aluminum workpiece or aluminum workpiece.

Figure 2:
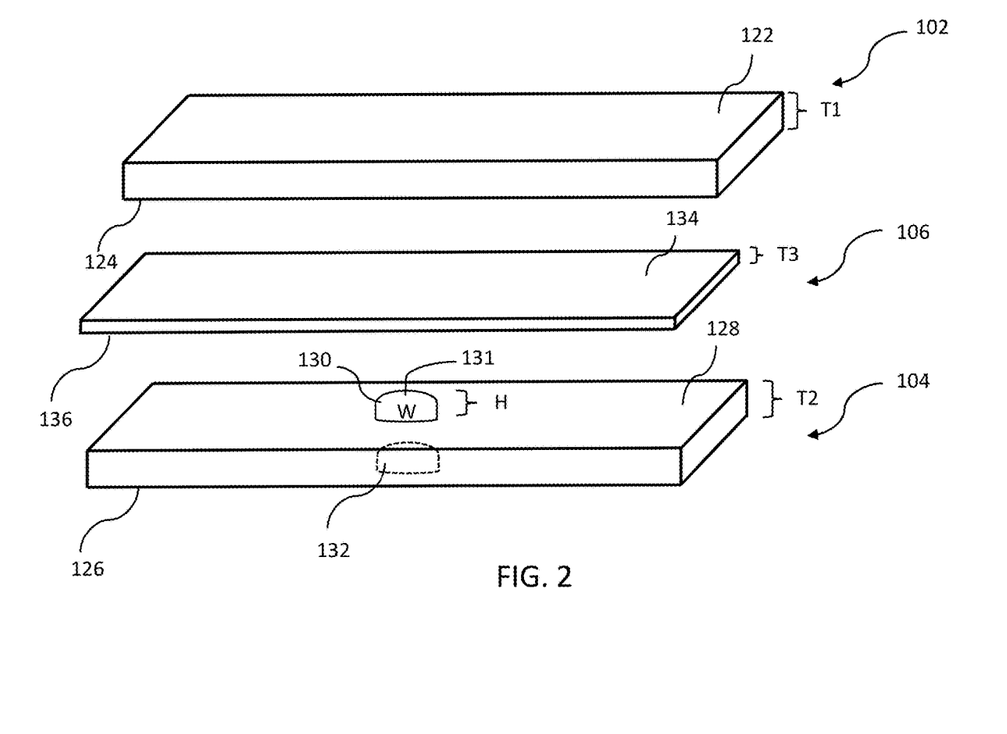
FIG. 2 is a diagrammatic exploded perspective view of the stacked workpieces of FIG. 1 prior to spot welding, according to an exemplary embodiment.

FIG. 2 shows the first workpiece 102, the second workpiece 104, and the third workpiece 106 arranged in an overlapping stack arrangement prior to assembly and spot resistance welding. The first workpiece 102 includes an external surface 122, a faying surface 124 opposite the external surface 122, and a thickness (T1) defined between the external surface 122 and the faying surface 124. Similarly, the second workpiece 104 includes an external surface 126, a faying surface 128 opposite the external surface 126, and a thickness (T2) defined between the external surface 126 and the faying surface 128. The third workpiece 106 includes a first faying surface 134 and a second faying surface 136 opposite the first faying surface, and thickness (T3) defined between the first faying surface and the second faying surface.

The thickness (T1) of the first workpiece 102 may be the same or different from that of the thickness (T2) of the second workpiece 104. The thickness of first workpiece 102 (T1) and the thickness (T2) of the second workpiece 104 are in the range of from as thin as 0.9 millimeters (mm) to 3 mm. The thickness (T3) of the third workpiece 106 is in the range of from about 0.4 mm to equal the greater of T1 or T2.

The faying surface 128 of the second workpiece 104 defines a protrusion 130 at a predetermined spot welding location. The protrusion 130 may be round, square, triangular, or of a more complex geometry and includes a distal end 131 spaced from the faying surface of the second workpiece 104. The protrusion 130 includes a width (W) of about 0.5 millimeter (mm) to about 5.0 mm, preferably from about 1.0 mm to 3.0 mm. The protrusion 130 includes a height (H), measured from the distal end to the faying surface of the second workpiece 104, of 0.1 mm to about 1.0 mm, preferably from about 0.25 mm to about 0.5 mm. The protrusion 130 may be formed by mechanical pressing, cold spraying, fusion welding such as metal inert gas (MIG) or tungsten inert gas (TIG) welding, or additive manufacturing. The external surface 126 of the second workpiece 104 defines a recession 132 opposite the protrusion 130 to assist in identifying the location of the protrusion 130 for the method.

The first workpiece 102, the second steel piece 104, and the third workpiece 106 sandwiched therebetween, may represent overlapping portions of metal subassemblies that are fitted and joined together into a structural stacked assembly 100 for an automotive vehicle (not shown). The joined overlapping regions require sufficient strength and durability to withstand the stress and strain incurred from normal vehicle operations. For example, the structural stacked assembly 100 may be that of a vehicle door assembly, in which the first workpiece 102 represents an inner door panel, the second workpiece 104 represents an outer door panel, and the third workpiece 106 represents a layer therebetween. The inner and outer door panels are arranged and stacked relative to each other. The overlapping regions of the panels are joined by a plurality of spot resistance welds to form a completed vehicle door assembly.

The following are examples of sheet materials that may be used in the manufacturing of structural vehicle components:

1.) A Dual-Phase steel with a tensile strength of 980 Mega Pascal (MPa) (i.e., DP980). A high strength low alloy steel with a yield strength of 340 MPa (HSLA 340LA). A 0.7 mm sheet of DP980 could be joined to a 1.4 mm sheet of HSLA 340LA by positioning a 1.0 mm 6022 aluminum sheet between the two steel sheets prior to welding.

2.) A 0.65 mm interstitial free steel sheet could be joined to a 1.2 mm DP980 steel sheet by positioning a 0.8 mm 6022 aluminum sheet between the two steel sheets.

3.) A 0.65 mm interstitial free steel sheet could be joined to a 1.6 mm aluminum-silicon coated press hardened steel by positioning a 0.8 mm 6022 aluminum sheet between the two steel sheets.

Figure 3:
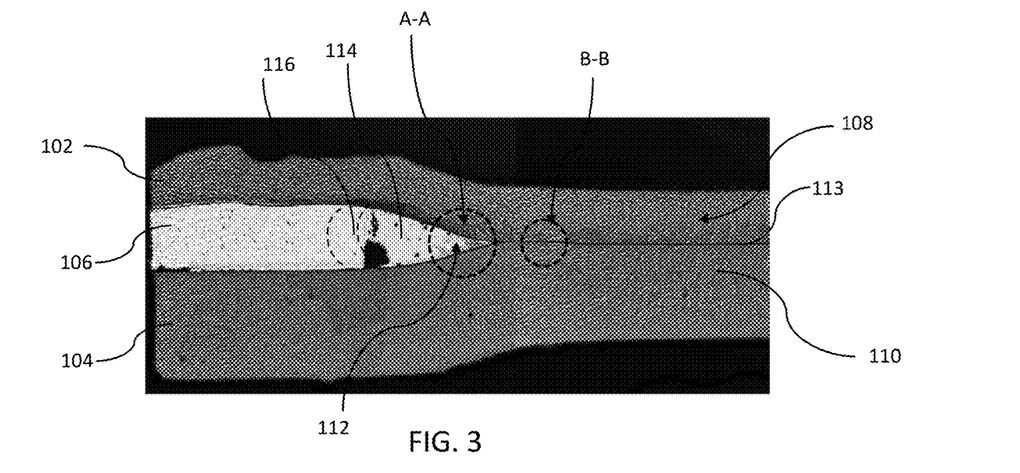
FIG. 3 is a micro-graph of a portion of a spot welded assembly of stacked dissimilar metal workpieces, according to an exemplary embodiment.
Figure 4:
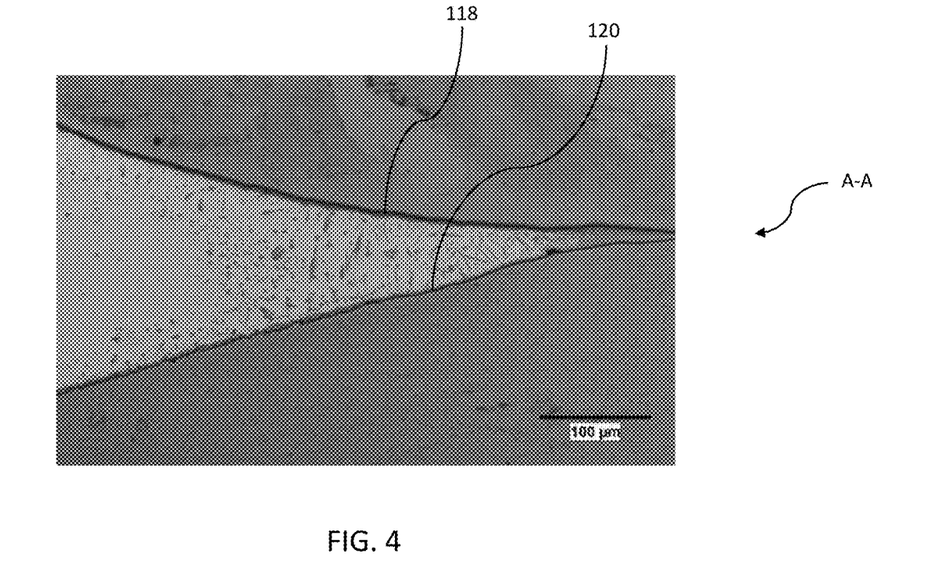
FIG. 4 is a micro-graph of a detailed view of section A-A of FIG. 3.
Figure 5:
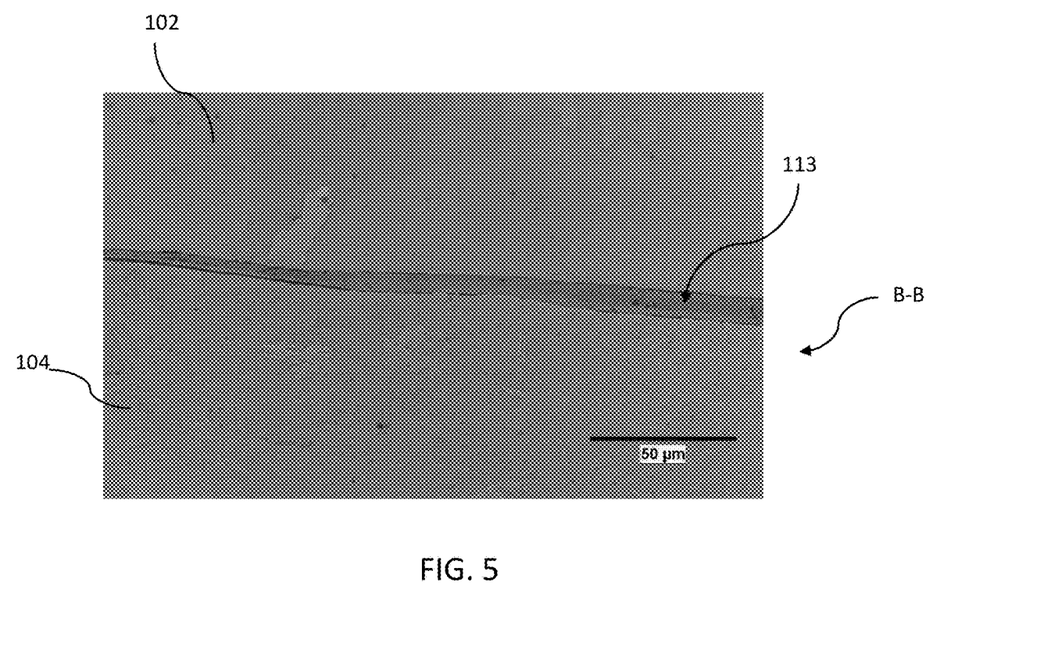
FIG. 5 is a micro-graph of a detailed view of section B-B of FIG. 3.
Figure 6:
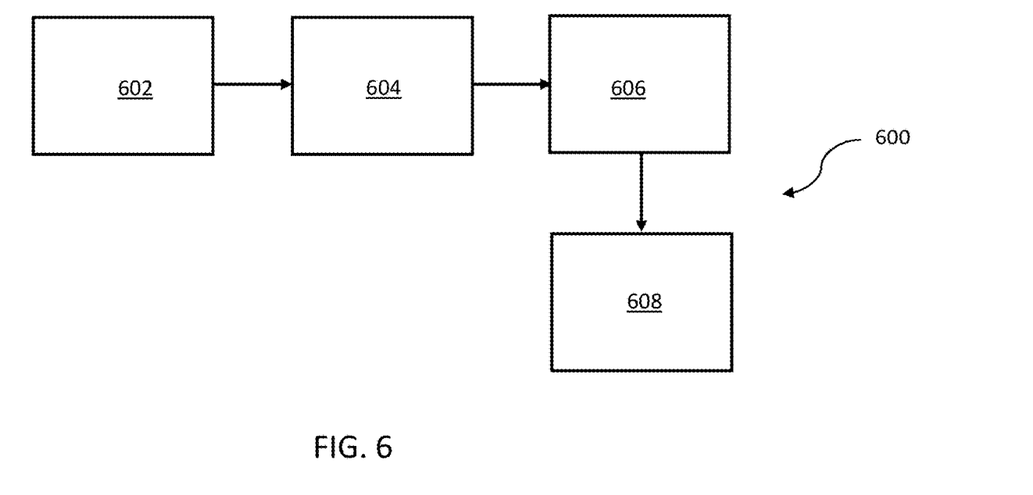
FIG. 6 is a flow diagram of a method for resistance spot welding of an assembly of stacked dissimilar metal workpieces, according to an exemplary embodiment.

The first, second, and third workpieces 102, 104, 106 are assembled and welded according to a method 600 shown in FIG. 6. Referring to FIG. 1 and FIG. 3, the welded stacked assembly 100 includes a spot weld 108 at a predetermined spot weld site. The resistance spot welding method 600 displaces a portion of the sandwiched third workpiece 106 and joins the first workpiece 102 and second workpiece 104 with a weld nugget 110, a first braze 111, or both a weld nugget 110 and a first braze 111 at a faying interface 113. The faying interface 113 may include a diameter (F) that is about 5 times the thickness (T3) of the third workpiece 106. The first braze 111 might not always form at the faying interface of the first workpiece 102 and the second workpiece 104. In some instances, such as when the first and second workpieces 102, 104 are of similar thickness and resistivity, a traditional weld nugget 110 would form. However, in instances where there are large disparities in the first and second workpieces 102, 104 thickness and resistivity, such as the example shown in FIG. 3, heat during resistance spot welding gets focused in one workpiece or the other. In this case, very little weld penetration (vertical growth) occurs in the thinner, less resistive workpiece, if weld penetration occurs. In these instances, the braze 111 forms a joint where one otherwise would not form.

Continuing to refer to FIG. 1 and FIG. 3, in this exemplary embodiment, the faying interface of the first workpiece 102 and the second workpiece 104 includes an about 2 micron (µm) to about 10 µm thick layer of iron-aluminides ($Fe_xAl_y$) acting as the braze 111. The thickness of the iron-aluminide ($Fe_xAl_y$) braze 111 at the faying interface 113 of the first and second workpieces 102, 104 can be controlled by changing the alloying content of the aluminum workpiece 106. Aluminum alloys with lower Si content and higher Mg such as 5xxx series aluminum, e.g., 5182 or 5754 aluminum, would promote a thicker braze 111 whereas aluminum alloys with higher Si content and lower Mg content such as 6xxx series aluminum, e.g., 6022 or 6111 aluminum, would promote a thinner braze 111.

Surrounding the notch root area 112, which is defined by the divergence of the first workpiece 102 and the second workpiece 104 from the faying interface 113, is an annular ring 114 of re-solidified aluminum alloy that was melted during the resistance spot welding process. Surrounding the annular ring 114 is a region of re-solidified aluminum alloy 116 that was partially melted during the resistance spot welding process. The resistance spot welded stacked assembly 100 further includes a $Fe_xAl_y$ braze 118, also referred to as a second braze 118, joining the annular aluminum ring 114 to the first workpiece 102 and a $Fe_xAl_y$ braze 120, also referred to as a third braze 120, joining the annular aluminum ring 114 and the second workpiece 104. The $Fe_xAl_y$ braze 118 joining the annular aluminum ring 114 to the first workpiece 102 and the $Fe_xAl_y$ braze 120 joining the annular aluminum ring 114 and the second workpiece 104 is present even if a braze is absent from the faying interface of the first workpiece 102 and the second workpiece 104.

The notch root area 112 includes a notch root angle ($\alpha$) of between about 5 to about 45 degrees, preferably between 10 to 30 degrees. The notch root angle $\alpha$ is measured from a line extended from the faying interface of the first and second workpieces 102, 104 at the weld site and the sloping faying interface of the first workpiece 102. The notch root area 112 is the weld structure that focuses stresses at the faying interface between the first and second workpieces 102, 104. Thus, if the notch root angle (a) is larger, also referred to broader, less stress is transferred to the faying interface 113. A larger notch root angle ($\alpha$) directs stresses well away from the notch root area 112 and makes it more difficult to pull the first and second workpieces 102, 104 apart, therefore more force is required before structural failure of the stacked assembly 100.

Shown in FIG. 6 is a block flow diagram for a method 600 of making the resistance spot welded stacked assembly 100 of FIG. 1. Beginning in Block 602 and shown in FIG. 7A, the first workpiece 102, second workpiece 104, and the third workpiece 106 are arranged and assembled such that the third workpiece 106 is layered between the first workpiece 102 and the second workpiece 104 to form a stacked assembly 100. The first workpiece 102 is assembled to the third workpiece 106 such that faying surface 124 of the first workpiece 102 is in abutting contact with the first faying surface 134 of the third workpiece 106. The second workpiece 104 is assembled to the third workpiece 106 such that the distal end 131 of the protrusion 130 is in abutting contact with the second faying surface 136 of the third workpiece 106.

Figure 7A:
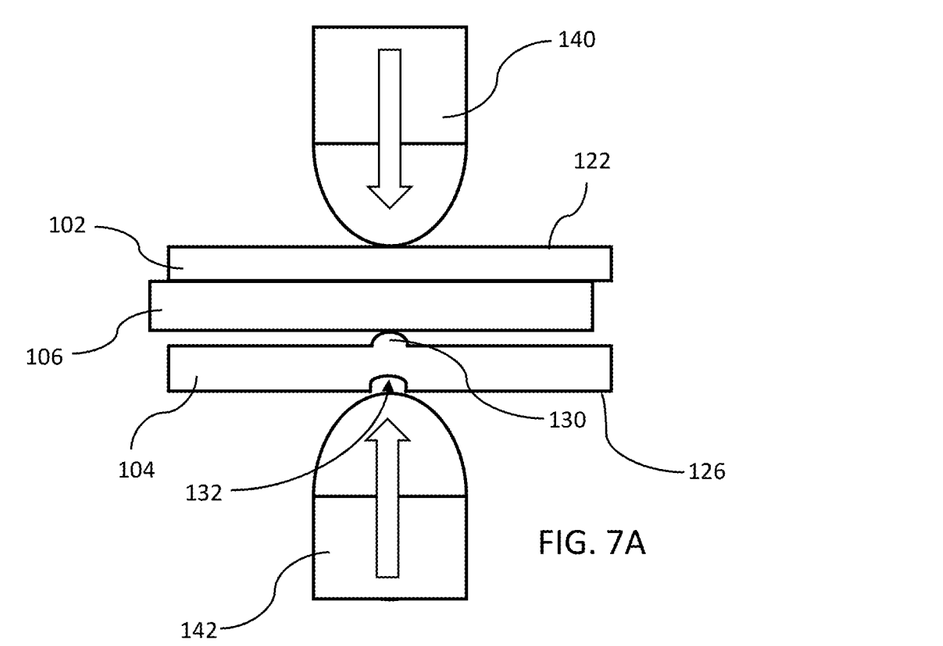
FIG. 7A is a diagrammatic view of the assembly of FIG. 1 arranged for resistance spot welding, according to an exemplary embodiment.

Moving to Block 604 and shown in FIG. 7A, a welding gun is used to resistance spot weld together the first workpiece 102, the second workpiece 104, and the third workpiece 106 therebetween. The welding gun provides the electrical current needed to spot weld the stacked assembly 100. The welding gun includes a pair of opposed spot welding electrodes, which includes a first welding electrode 140 and a second welding electrode 142. Each of the welding electrodes 140, 142 includes a standard rounded end, also known as a ballnose, contacting the respective external surfaces 122, 126 of the first and second workpieces 102, 104 in opposing alignment with one another at the predetermined weld site. The first welding electrode 140 is positioned onto the external surface 122 of the first workpiece 102 in alignment with the protrusion 130 extending from the faying surface 128 of the second workpiece 104. The second electrode 142 is positioned onto the external surface 126 of the second workpiece 104 directly over the recession 132 and in alignment with the protrusion 130.

A pair of arms of a welding gun (not shown) applies a clamping, or compression, force against the oppositely-facing external surface 122 of the first workpiece 102 and the external surface 126 of the second workpiece 104. The compression force is normal to the external surfaces to establish a good mechanical and electrical contact between the first and second welding electrodes and their respective external surfaces of the first and second workpieces 102, 104. A welding current is then passed between the first and second welding electrodes 140, 142 and through the stacked assembly 100 at the weld site. The welding current is typically a direct current (DC) between about 5 kA and about 50 kA. The compression force is maintained on the stacked assembly 100 by the pair of electrodes 140, 142 while the welding current is passed through the weld site.

As the welding current is passed through the weld site, the first workpiece 102 and the second workpiece 104 heat up more quickly than the third workpiece 106 because the steel alloys have a relatively higher resistivity than the aluminum alloy. The first and second workpieces 102, 104 become soften, more malleable, as the workpieces heats up. Heat energy is transferred by conduction from the first and second workpieces 102, 104 to melt a portion of the third workpiece 106 at the weld site into a molten pool of aluminum.

Figure 7B:
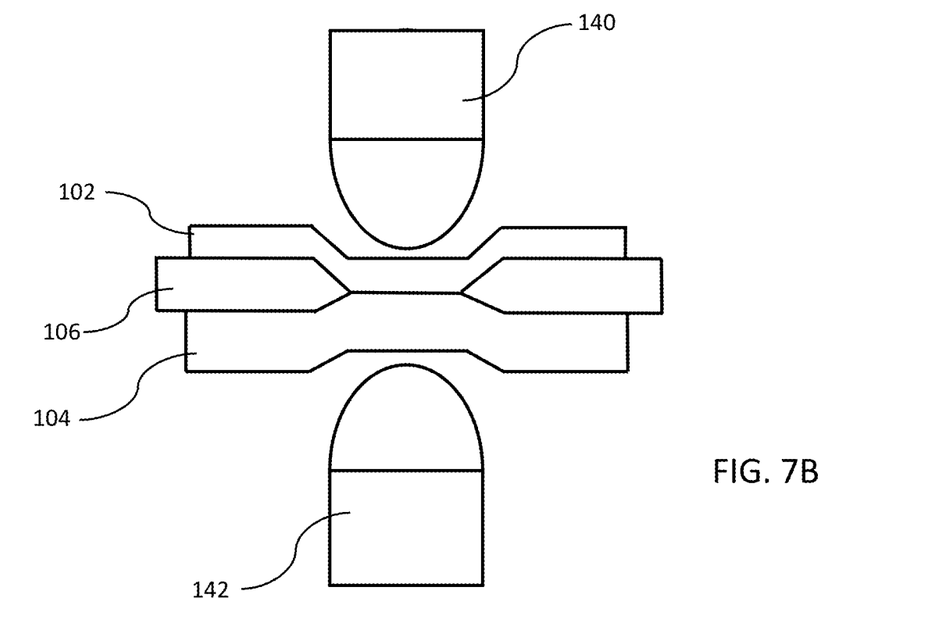
FIG. 7B is a diagrammatic view of the stacked assembly of FIG. 7A after resistance spot welding.

Moving to Block 606, the compression force applied by the opposing pair of electrode urges the protrusion 130 extending from the faying surface 128 of the second workpiece 104 to penetrate into third workpiece 106 and displaces the molten pool of aluminum making way for the faying surface 128 of the second workpiece 104 to contact the faying surface of the first workpiece 102 to form at least one weld nugget 110 when solidified, thus joining the first workpiece 102 to the second workpiece 104. The compression force applied by the opposing pair of electrodes 140, 142 onto the first and second workpieces 102, 104 urges the molten pool of aluminum alloy apart from the faying interface 113 and into any voids that may have formed in the notch root area 112 defined by the first workpiece 102 and the second workpiece 104. The flow of molten material into the voids of the notch root area 112 act to increase the strength of the joint of the stacked assembly 100 upon re-solidification of the melted pool of aluminum alloy. The annular ring 114 of molten pool of aluminum alloy maintains an angle alpha of between 5 to 45 degrees by preventing the faying surfaces of the first and second workpieces 102, 104 from collapsing under the compression forces of the electrodes.

Shown in FIGS. 9A through 9D are exemplary welding scheduled. The vertical axis represents the compression force, also referred to as weld force, and welding current applied during each resistance spot welding event, while the horizontal axis represents a period of time elapsed for each resistance spot welding event. The solid line represents the compression force applied onto the stacked assembly 100 by the electrodes with respect to time, and the broken lines represents the welding current applied by the electrodes with respect to time. The compression force asserted by the electrodes ranges from 2 Kilo-Newton (kN) to 7 kN, preferably 2 kN to 5 kN. The weld currents could range from 6 Kilo-Amps (kA) to 15 kA, preferably 8 kA to 14 kA. Each application of weld current could range from 80 to 270 Milliseconds (ms) in duration or more typically 100 ms to 200 ms.

Moving to Block 608, the weld current is discontinued and the electrodes are retracted. Upon stoppage of the welding current, the molten aluminum alloy weld pool solidifies to form the annular weld ring 114 surrounding and encompassing the notch area, as well as the Al—Fe braze 118, 120 between the aluminum annular ring 114 and the first and second workpieces 102, 104 as illustrated generally in FIG. 1 and shown in FIG. 3.

The annular aluminum ring 114 strengthens the weld structure by altering the profiles of the partially melt heat affected zone and heat affected zone of the third workpiece 106 by moving it further away from the notch root area 112. The annular aluminum ring 114 increased the size or outer reaches of the steel heat affected zones because, rather than a slight air gap, or void, existing between the two metal sheets, the air gap in the notch root would be filled with hot aluminum metal which would slow cooling. The aluminum will also act to conduct heat laterally away from the weld region, which will heat the steel potentially providing desirable tempering action. This change to the thermal environment will move the hardness trough typically associated with the inter-critical heat affected zone of the steel further away from the steel weld nugget 110 to where the steel has not thinned due to the heat and forces applied during welding.

The method using the protrusion 130 on the faying surface 128 of the second workpiece 104 produces a 2 µm to 10 µm thick layer of iron-aluminides (Fe—Al) acting as a braze at the faying interface between the first workpiece 102 and the second workpiece 104. In a conventional method of welding without the protrusion 130 on the faying surface of the second workpiece 104, this braze would not be expected because aluminum melts at a much lower temperature than steel, approximately 660° C. vs. 1500° C., respectively.

Figure 8A:
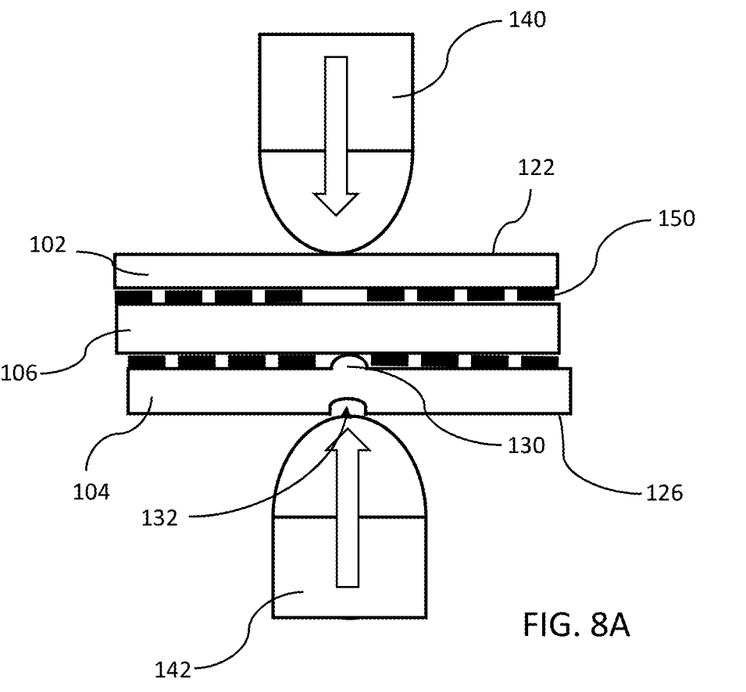
FIG. 8A is a diagrammatic view of the assembly of FIG. 1 arranged for resistance spot welding, according to another exemplary embodiment.
Figure 8B:
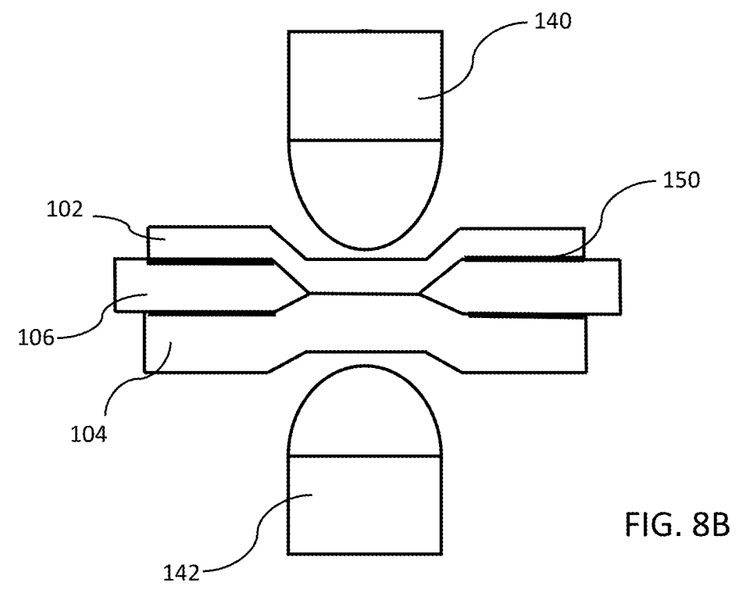
FIG. 8B is a diagrammatic view of the assembly of FIG. 8A after resistance spot welding.
Figure 9A:
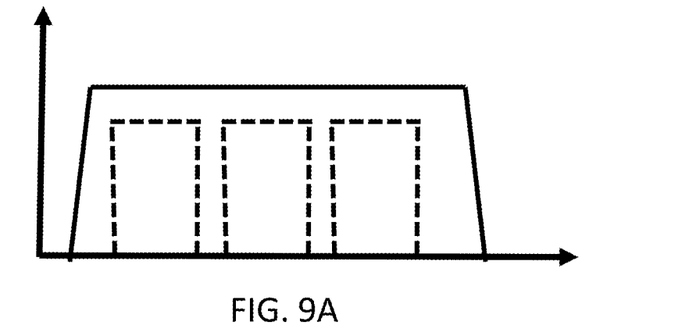
FIGS. 9A through 9D are exemplary resistance spot welding schedule for the resistance spot welding of the assembly of FIG. 1.
Figure 9B:
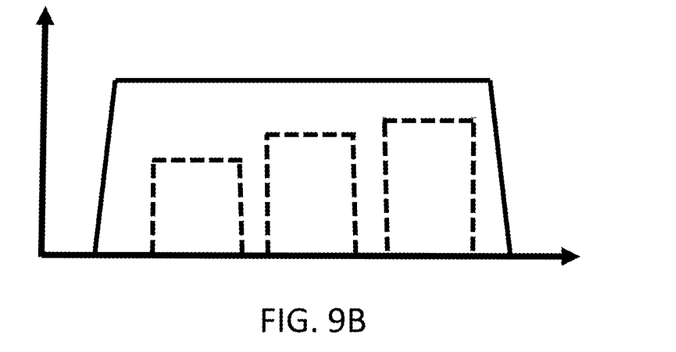
Figure 9C:
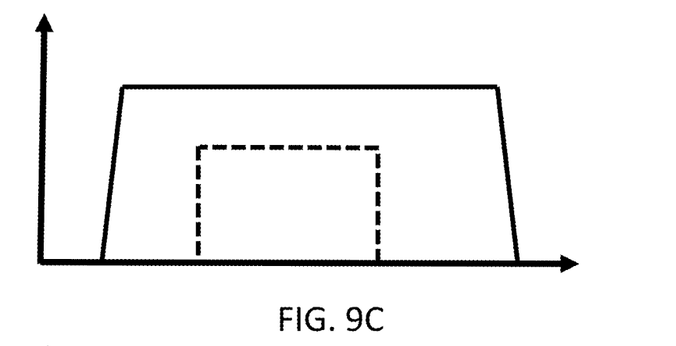
Figure 9D:
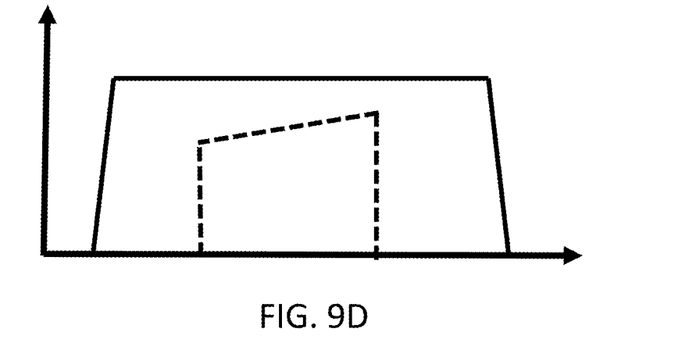

Referring to FIGS. 8A and 8B, and to Block 602 of FIG. 6, a weld-through structural adhesive or sealant 150 may be applied between the faying surfaces 124, 128 of the steel workpieces 102, 104 and the faying surfaces 134, 136 of the aluminum workpiece 106 during the assembly and before the spot welding. The structural adhesive or sealant inhibits corrosion of the weld join by sealing off moisture and prevents galvanic corrosion between the non-brazed aluminum and steel workpieces.

The method 600 disclosed above, provides a robust resistant spot weld stacked assembly 100 of dissimilar metal workpieces. The method 600 enables the resistance spot welding of a thin aluminum workpiece 106 having a minimum thickness (T3) of 0.4 mm to thin steel workpieces 102, 104 having a thickness (T1), (T2) of between 0.9 mm to 3.0 mm, preferably 0.9 mm to 2.0 mm. The method 600 further enables the use standard ballnose electrodes, without the need for complex electrode geometries, for resistance spot welding of an aluminum workpiece 106 sandwiched between two steel workpieces 102, 104.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for resistance spot welding, comprising:
   arranging:
   a first workpiece having an external surface and an opposite faying surface,
   a second workpiece having an external surface and an opposite faying surface defining a protrusion, and
   a third workpiece have a first faying surface and an opposite second faying surface, such that the faying surface of the first workpiece is in abutting contact with the first faying surface of the third workpiece and the protrusion of the faying surface of the second workpiece is in abutting contact with the second faying surface of the third workpiece; and
   resistance spot welding the first workpiece, the second workpiece, and the third workpiece by passing an electric current between the external surface of the first workpiece and the external surface of the second workpiece through the protrusion.

2. The method of claim 1, wherein the third workpiece includes a lower electrical resistivity and a lower melting temperature than an electrical resistivity and a melting temperature of the first workpiece and an electrical resistivity and a melting temperature of the second workpiece, and
   the electric current comprises a sufficient direct current to melt a portion of the third workpiece immediately adjacent the protrusion into a molten pool.

3. The method of claim 2, further comprises applying a compression force onto the external surface of the first workpiece and on the external surface of the second workpiece to urge the protrusion to penetrate and to displace the molten pool to make way for the faying surface of the second workpiece to contact the faying surface of the first workpiece to define a faying interface;
   wherein the electric current comprises a sufficient direct current to form at least one weld nugget at the faying interface to join the first workpiece to the second workpiece with the third workpiece sandwiched therebetween.

4. The method of claim 3, wherein the compression force is sufficient to cause the protrusion to displace the molten pool into an annular ring surrounding the faying interface.

5. The method of claim 4, wherein the first workpiece comprises a first steel alloy, the second workpiece comprises a second steel alloy, and the third workpiece comprises an alloy selected from a group consisting of an aluminum alloy, a copper alloy, and a magnesium alloy.

6. The method of claim 5, wherein the third workpiece includes a thickness (T3) of about 0.4 mm to about 0.5 mm, and the protrusion includes a width (W) of about 1.0 mm to 3.0 mm and a height (H) of about 0.1 mm to about 1.0 mm.

7. The method of claim 6, wherein the first workpiece includes a first thickness (T1) and the second workpiece includes a second thickness (T2), wherein (T1) is between about 0.9 mm to about 3.0 mm and (T2) is between about 0.9 mm to about 3.0 mm.

8. The method of claim 2, wherein the direct current comprises about 8 kilo-amps (kA) to about 14 kA.

9. The method of claim 4, wherein the compression force is between about 2 Kilo-Newton (kN) to about 5 kN.

10. The method of claim 1, further comprising applying a weld-through structural adhesive between the first workpiece and the third workpiece and between the second workpiece and the third workpiece.

11. A method of resistance spot welding a stack assembly comprising;
    forming a stack assembly by sandwiching an aluminum sheet between a first steel sheet and a second steel sheet, wherein the second steel sheet includes a protrusion in abutting contact with the aluminum sheet at a predetermined weld site; and
    resistance spot welding the stack assembly at the predetermined weld site by applying a direct current through the stack assembly at the predetermined weld site to melt a portion of the aluminum sheet immediately adjacent the protrusion into a molten pool of aluminum, and applying a compression force at the predetermined weld site to urge the protrusion to penetrate and displaces the molten pool to make way for the faying surface of the second steel sheet to contact the faying surface of the first steel sheet to define a faying interface.

12. The method of claim 11, wherein the resistance spot welding includes applying a sufficient direct current and a sufficient compression force to form a first braze at the faying interface to join the first steel sheet to the second steel sheet thereby retaining the aluminum sheet therebetween.

13. The method of claim 11, wherein the resistance spot welding includes applying a sufficient direct current and a sufficient compression force to form a weld nugget at the faying interface to join the first steel sheet to the second steel sheet.

14. The method of claim 11, wherein the second steel sheet includes an external surface defining a recession opposite the protrusion for locating the predetermined weld site.

15. The method of claim 12, wherein the resistance spot welding includes applying a sufficient direct current and a sufficient compression force to form a second braze joint between the first steel sheet and the aluminum sheet, and a third braze joint between the second steel sheet and the aluminum sheet.

16. A stack assembly comprising:
a first sheet comprising a first alloy, a second sheet comprising a second alloy, and a third sheet comprising a third alloy sandwiched between the first sheet and the second sheet, wherein the third alloy includes a lower resistivity and a lower melting temperature than an electrical resistivity and a melting temperature of the first workpiece and an electrical resistivity and a melting temperature of the second workpiece;
a faying interface defined by a portion of the first sheet in direct contact with a portion of the second sheet through the third sheet;
a weld nugget joining the first sheet to the second sheet at the faying interface; and
an annular ring of re-solidified molten pool of third alloy surrounding the faying interface.

17. The stack assembly of claim 16, further comprising a first braze at the faying interface joining the first sheet to the second sheet.

18. The stack assembly of claim 17, further comprising a second braze between the first sheet and the third sheet, and a third braze between the second sheet and the third sheet.

19. The stack assembly of claim 18, further comprising a notch root area defined by a divergence of the first sheet and the second sheet from the faying interface, the root notch area includes a notch root angle ($\alpha$) of between about 10 to about 30 degrees.

20. The stack assembly of claim 16, further comprising a region of re-solidified partially melted third alloy surrounding the annular ring.

* * * * *